(12) United States Patent
Chen

(10) Patent No.: US 12,449,006 B2
(45) Date of Patent: Oct. 21, 2025

(54) CLUTCH AND WORK MACHINE HAVING SAME

(71) Applicant: Techtronic Cordless GP, Anderson, SC (US)

(72) Inventor: You Liang Chen, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 18/524,883

(22) Filed: Nov. 30, 2023

(65) Prior Publication Data

US 2024/0183410 A1 Jun. 6, 2024

(30) Foreign Application Priority Data

Dec. 1, 2022 (CN) .......................... 202211538123.1

(51) Int. Cl.
*F16D 41/12* (2006.01)
*A01D 69/08* (2006.01)
(52) U.S. Cl.
CPC ............. *F16D 41/12* (2013.01); *A01D 69/08* (2013.01)
(58) Field of Classification Search
CPC ...... F16D 41/063; F16D 41/082; F16D 41/18; F16D 41/12; F16D 41/16; A01D 69/08; A01D 34/69; A01D 2101/00
See application file for complete search history.

(56) References Cited

U.S. PATENT DOCUMENTS 1,924,723 A 8/1933 Nowak
2,332,118 A 10/1943 Spinello
(Continued)

FOREIGN PATENT DOCUMENTS

AU 2021102159 A4 6/2021
CA 3120730 5/2020
(Continued)

OTHER PUBLICATIONS

DE960958C Translation (Year: 1997).*

*Primary Examiner* — James A Shriver, II
*Assistant Examiner* — Caitlin Anne Miller
(74) *Attorney, Agent, or Firm* — Dority & Manning, P.A.

(57) ABSTRACT

The present invention provides a clutch and a work machine having same. The clutch comprises an input member for receiving a driving force and rotating, an output member for outputting rotational motion, and at least one transmission member. The input member has at least one radially extending protrusion. The output member has at least one transmission engagement part. The transmission member is movable between a first position of engagement with the transmission engagement part and a second position of disengagement, being located in a path of rotation of the protrusion, and able to abut the protrusion and be driven to move to the first position. Displacement of the transmission member between the first position and second position has a radial component. According to the technical solution of the present invention, the function of automatically switching between transmission states according to the operating state of a prime mover can be achieved. The fact that displacement of the transmission member comprises a radial component helps to reduce the axial thickness of the clutch, so that the structure thereof is more compact.

20 Claims, 10 Drawing Sheets

(56) References Cited

U.S. PATENT DOCUMENTS

| | | | |
|---|---|---|---|
| 3,249,185 A * | 5/1966 | Moorhead | F16D 41/16 192/43.1 |
| 3,447,650 A * | 6/1969 | Dossier | F16D 41/063 192/93 R |
| 3,865,219 A * | 2/1975 | Dossier | F16D 41/063 192/41 R |
| 3,871,159 A | 3/1975 | Shriver | |
| 3,877,556 A * | 4/1975 | Brownscombe | F16D 41/063 192/45.1 |
| 4,186,545 A | 2/1980 | Hutchison | |
| 4,226,312 A | 10/1980 | Zindler | |
| 4,226,313 A | 10/1980 | Meldahl et al. | |
| 4,287,972 A | 9/1981 | Petrak | |
| 4,418,811 A | 12/1983 | MacDonald | |
| 4,570,769 A * | 2/1986 | Isaka | F16D 41/12 192/108 |
| 5,400,885 A * | 3/1995 | Phillips | B25F 3/00 192/223.1 |
| 7,100,756 B2 | 9/2006 | Kimes et al. | |
| 7,302,789 B2 | 12/2007 | Venson, Sr. | |
| 7,337,598 B2 | 3/2008 | Plouraboue | |
| 7,479,754 B2 | 1/2009 | Lucas | |
| 7,665,589 B2 | 2/2010 | Blanchard | |
| 7,669,702 B2 | 3/2010 | Blanchard | |
| 7,728,534 B2 | 6/2010 | Lucas et al. | |
| 7,741,793 B2 | 6/2010 | Lucas et al. | |
| 7,884,560 B2 | 2/2011 | Lucas et al. | |
| 8,037,986 B2 | 10/2011 | Takasu | |
| 8,429,885 B2 | 4/2013 | Rosa et al. | |
| 8,653,786 B2 | 2/2014 | Baetica et al. | |
| 8,672,110 B2 | 3/2014 | Jaeger | |
| 8,727,335 B1 | 5/2014 | Vicente, Jr. | |
| 8,732,896 B2 | 5/2014 | Lucas et al. | |
| 9,060,463 B2 | 6/2015 | Yamaoka et al. | |
| 9,456,546 B2 | 10/2016 | Blanchard | |
| 9,759,300 B2 | 9/2017 | Barendrecht | |
| 9,787,225 B2 | 10/2017 | Lucas et al. | |
| 9,856,930 B2 | 1/2018 | Heath et al. | |
| 9,888,627 B2 | 2/2018 | Yamaoka et al. | |
| 10,039,229 B2 | 8/2018 | Wadzinski et al. | |
| 10,070,588 B2 | 9/2018 | Yamaoka et al. | |
| 10,111,381 B2 | 10/2018 | Shaffer et al. | |
| 10,123,478 B2 | 11/2018 | Shaffer et al. | |
| 10,130,031 B2 | 11/2018 | Yoshimura et al. | |
| 10,271,476 B2 | 4/2019 | Yoshimura et al. | |
| 10,524,417 B2 | 1/2020 | Fan et al. | |
| 10,550,899 B2 * | 2/2020 | Vaughn | F16D 41/12 |
| 10,690,230 B2 | 6/2020 | Teillet et al. | |
| 10,746,279 B2 | 8/2020 | Barendrecht | |
| 10,856,467 B2 | 12/2020 | Maggard | |
| 11,125,313 B2 | 9/2021 | Teillet | |
| 11,181,156 B2 | 11/2021 | Hedge | |
| 11,371,561 B2 | 6/2022 | Brosset et al. | |
| 11,523,558 B2 | 12/2022 | Teillet et al. | |
| 11,672,202 B2 | 6/2023 | Teillet et al. | |
| 2009/0250303 A1 * | 10/2009 | Matsuzaki | F16D 41/18 192/46 |
| 2012/0098367 A1 * | 4/2012 | Mizutani | F16D 3/50 310/76 |
| 2015/0245559 A1 | 9/2015 | Yang et al. | |
| 2019/0360537 A1 * | 11/2019 | Burke | F16C 19/06 |
| 2020/0253114 A1 | 8/2020 | Yan | |
| 2020/0340539 A1 | 10/2020 | Matsumoto | |
| 2021/0329832 A1 | 10/2021 | Yamaoka et al. | |
| 2022/0106140 A1 * | 4/2022 | Chang | B65H 3/56 |
| 2022/0186793 A1 | 6/2022 | Guiroult | |
| 2023/0023943 A1 | 1/2023 | Bru et al. | |
| 2023/0052464 A1 | 2/2023 | Rousselot et al. | |
| 2023/0217860 A1 * | 7/2023 | Chen | F16D 23/12 56/14.7 |
| 2023/0256808 A1 | 8/2023 | Bray et al. | |
| 2023/0271592 A1 | 8/2023 | Bray et al. | |
| 2023/0272840 A1 | 8/2023 | Bray | |
| 2023/0336050 A1 | 10/2023 | Barendrecht | |
| 2024/0183410 A1 * | 6/2024 | Chen | F16D 41/12 |

FOREIGN PATENT DOCUMENTS

| | | |
|---|---|---|
| CN | 207836212 U | 9/2018 |
| CN | 111615932 | 9/2020 |
| CN | 112283265 | 1/2021 |
| CN | 112554118 | 3/2021 |
| CN | 213784250 | 7/2021 |
| DE | 960958 C * | 3/1957 |
| DE | 2037145 | 3/1971 |
| DE | 2417499 | 10/1975 |
| DE | 102016219234 | 5/2017 |
| FR | 2776729 | 10/1999 |
| FR | 2889276 | 2/2007 |
| GB | 612652 | 11/1948 |
| WO | WO2022157438 A1 | 7/2022 |

* cited by examiner

A-A

CLUTCH AND WORK MACHINE HAVING SAME

This application claims priority to Chinese Patent Application No. 202211538123.1, filed on Dec. 1, 2022, the disclosure of which is incorporated by reference herein in its entirety.

TECHNICAL FIELD

The present invention relates to a clutch and a work machine having same.

BACKGROUND ART

Walk-behind work machines such as lawnmowers are generally provided with wheels for movement. The wheels enable the operator to move the walk-behind work machine to different work sites to perform corresponding work tasks. In some application scenarios, the operator may provide the driving force needed to move the work machine. In other application scenarios, the driving force may also be provided by a primer mover (such as a motor or internal combustion engine) provided on the work machine, the prime mover being coupled to the wheels by means of a transmission apparatus (such as a gearbox comprising a clutch), to realize transmission of the driving force, in which case the work machine may have a self-propulsion function.

When the driving force is provided by a prime mover, it is desirable that the transmission apparatus be able to provide a stable and efficient transmission coupling. When an external traction force provided by the operator or another external apparatus serves as the driving force (in particular in a state in which the prime mover has stopped operating), it is desirable that the transmission apparatus be able to break the transmission coupling between the prime mover and the wheels, to prevent the prime mover from rotating with the wheels and causing a large amount of resistance. At present, walk-behind work machines are generally provided with a control apparatus such as a control rod and pull wire: the operator can switch manually between states of the transmission apparatus by means of the control apparatus, to establish or break the transmission coupling according to different operating modes. Such a manner of operation requires manual intervention and is quite complex, and is unable to achieve automatic switching between states of the transmission apparatus according to the operating state of the prime mover.

Thus, there is a need to provide an alternative solution to at least partially alleviate or mitigate the abovementioned shortcomings.

SUMMARY OF THE INVENTION

The objective of the present invention is to provide a clutch and a work machine having same, to achieve automatic switching between transmission states of a transmission apparatus according to the operating state of a prime mover while providing other additional advantages, such as the structure of the transmission apparatus being smaller and more compact, realizing a differential function, etc.

A clutch according to one aspect of the present invention comprises:

- an input member, the input member being configured to receive a driving force and rotatable about a rotation axis under the action of the driving force, the input member having at least one protrusion extending in a radial direction relative to the rotation axis;
- an output member, the output member being configured to output rotational motion and having at least one transmission engagement part;
- at least one transmission member, the at least one transmission member being configured to be movable between a first position in which it is engageable with the transmission engagement part and a second position of disengagement, the at least one transmission member being located in a path of rotational motion of the protrusion, and able to abut the protrusion and be driven to move to the first position, wherein displacement of the at least one transmission member between the first position and the second position has a component in the radial direction.

In some embodiments, the clutch further comprises a biasing member, which biases the at least one transmission member towards the second position.

In some embodiments, the biasing member is a spring, the spring having one end coupled to the at least one transmission member, and another end coupled to the input member or a mounting member for mounting the at least one transmission member.

In some embodiments, the at least one transmission member is able to abut the protrusion and be driven to move to the second position.

In some embodiments, a sharp bump is provided at an inner side of the at least one transmission member, the sharp bump being able to abut the protrusion when the input member rotates in a direction opposite to a drive direction.

In some embodiments, the clutch is configured such that the input member rotates through a predetermined angle in a direction opposite to a drive direction when the outputting of rotational motion is stopped.

In some embodiments, the at least one transmission member moves in a plane perpendicular to the rotation axis.

In some embodiments, the at least one transmission member moves in the plane between the first position and the second position along a straight line inclined relative to the radial direction.

In some embodiments, the protrusion comprises three protrusions arranged at uniform intervals in the circumferential direction about the rotation axis, and the at least one transmission member comprises three transmission members arranged in one-to-one correspondence with the protrusions.

In some embodiments, the transmission engagement part of the output member comprises a stop wall extending parallel to the rotation axis, the at least one transmission member abutting the stop wall to achieve engagement with the transmission engagement part.

In some embodiments, the stop wall extends substantially in the radial direction.

In some embodiments, when the at least one transmission member is located at the second position, the at least one transmission member is located outside a path of rotational motion of the stop wall.

In some embodiments, the output member is provided with a cam surface extending parallel to the rotation axis: the cam surface is located between two adjacent stop walls, and connects a radially outside end of one of the stop walls to a radially inside end of the other adjacent stop wall, at least part of the cam surface being a curved surface.

In some embodiments, in the direction of the driving force, the angular velocity of rotation of the output member is greater than or equal to the angular velocity of rotation of the input member.

In some embodiments, the clutch further comprises a mounting member for mounting the at least one transmission member, the mounting member being provided with an elongated slot defining a movement path of the at least one transmission member between the first position and the second position.

In some embodiments, the elongated slot comprises a curved surface, to allow the at least one transmission member to pivot in the elongated slot.

In some embodiments,
the output member is provided with a recess, and at least one of the at least one transmission member, the mounting member and the input member is at least partially disposed in the recess: or
the input member is provided with a recess, and at least one of the at least one transmission member, the mounting member and the output member is at least partially disposed in the recess.

In some embodiments, the mounting member is provided with a mounting slot formed as a sunken cavity, the input member being accommodated in the sunken cavity.

In some embodiments, the mounting member is provided with a damping element, the damping element being configured to be able to provide damping so that the mounting member tends to remain stationary.

In some embodiments, the damping element provides damping by rubbing against a member other than the input member and the transmission member, in particular by rubbing against a transmission case accommodating the clutch.

In some embodiments, the damping element is made of a rubber or silicone rubber material, and extends radially outwards relative to the mounting member.

A work machine according to another aspect of the present invention comprises a prime mover, at least one wheel and the clutch as described above, the prime mover driving the input member of the clutch, and the output member of the clutch driving at least one of the at least one wheel to rotate.

In some embodiments, the work machine comprises two clutches arranged in a mirror-image fashion, each clutch being coupled to at least one corresponding wheel.

In some embodiments, the work machine is a gardening tool, in particular a lawnmower or a snow blower.

The clutch and work machine according to the present invention are able to achieve the following beneficial effects:
1) The transmission member can move automatically to the first position of engagement with the output member under the action of the radially extending protrusion of the input member, and can move automatically to the second position of disengagement from the output member under the action of the biasing member when the input member stops moving. The function of automatically switching between transmission states according to the operating state of the prime mover is thereby achieved.
2) Displacement of the transmission member between the first position and second position comprises a radial component, helping to reduce the axial thickness of the clutch along the rotation axis, so that the structure of the clutch is more compact.
3) In some preferred embodiments, a speed differential function can be achieved.

BRIEF DESCRIPTION OF THE DRAWINGS

To better understand the above and other objectives, features, advantages and functions of the present invention, the preferred embodiments shown in the drawings may be referred to. In the drawings, identical reference labels denote identical components. Those skilled in the art should understand that the drawings are intended to illustrate preferred embodiments of the present invention schematically, and have no limiting effect on the scope of the present invention, and the various components in the drawings are not drawn to scale.

Figure 1:
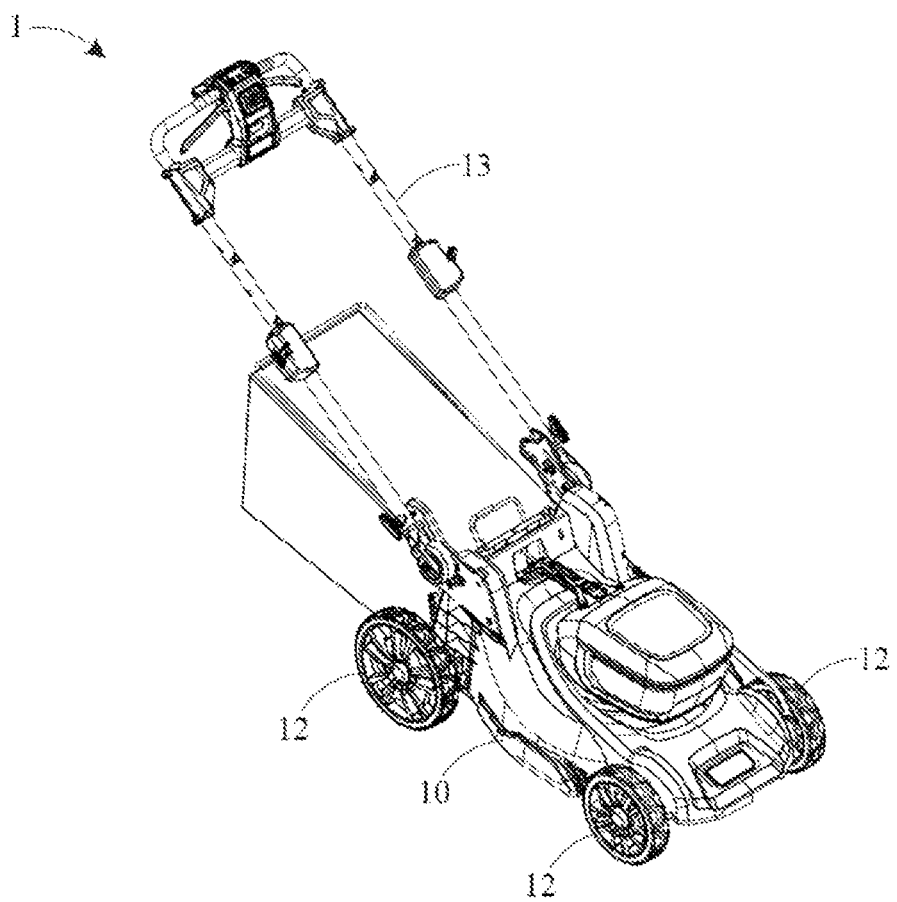
FIG. 1 is a 3D drawing of a work machine according to a preferred embodiment of the present invention.

KEY TO THE DRAWINGS 1 lawnmower
10 base
11 cutting tool
12 wheel
13 hand support frame
20 prime mover
201 output shaft
21 transmission apparatus
211 first gear
212 second gear
213 third gear
214 fourth gear
215 fifth gear
216 coupling shaft
22 transmission case
30/30'/30" clutch
31/31' input member
311 input engagement part
312 protrusion
32/32' output member
321 output engagement part
322 transmission engagement part
323 cam surface
323a downstream end
323b upstream end
324 recess
33/33' transmission member
331 pin structure 332 sharp bump
34/34" mounting member
341 elongated slot
342 fastener
343 first mounting slot
344 second mounting slot
345 damping element
346 holding part
35 spring
40 drive shaft
AX rotation axis
F drive direction
F1 direction opposite to drive direction

DETAILED DESCRIPTION OF EMBODIMENTS

Particular embodiments of the present invention are now described in detail with reference to the drawings. The embodiments described here are merely preferred embodiments of the present invention. Based on these preferred embodiments, those skilled in the art will be able to think of other ways in which the present invention could be implemented, all of which likewise fall within the scope of the present invention.

The present invention provides a work machine, in particular a gardening tool, which is able to move between different positions by means of wheels under the action of an external traction force and/or a driving force provided by its own prime mover. In addition, the present invention further provides a clutch for the work machine. The clutch is disposed between the prime mover and the wheels, and used to transmit the driving force of the prime mover to the wheels.

The work machine is preferably provided with a hand support frame, to facilitate gripping and application of force by the operator. Such a work machine may also be called a walk-behind work machine. One example of a walk-behind work machine is a lawnmower, which is configured to be able to move over the growth surface of grass or a lawn and be operated to perform a grass-cutting function. Such an action is usually referred to as "trimming a lawn", and is generally performed by a gardener or landscape worker to maintain the surface of the lawn. In addition, other examples of walk-behind work machines may be snow blowers, plowing machines, micro tillers and wheeled vacuum cleaners. Preferred embodiments according to the present invention are presented in detail below with reference to the drawings.

Figure 2:
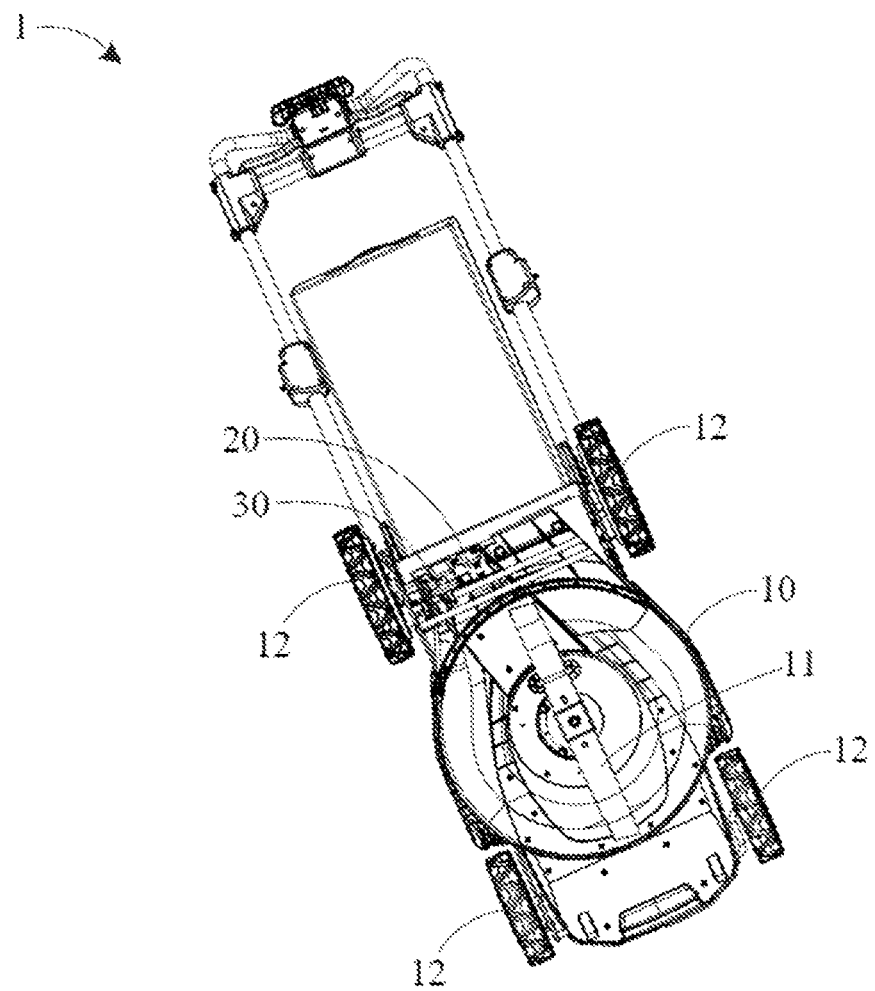
FIG. 2 is a 3D drawing of the work machine shown in FIG. 1, viewed from another angle.
Figure 3:
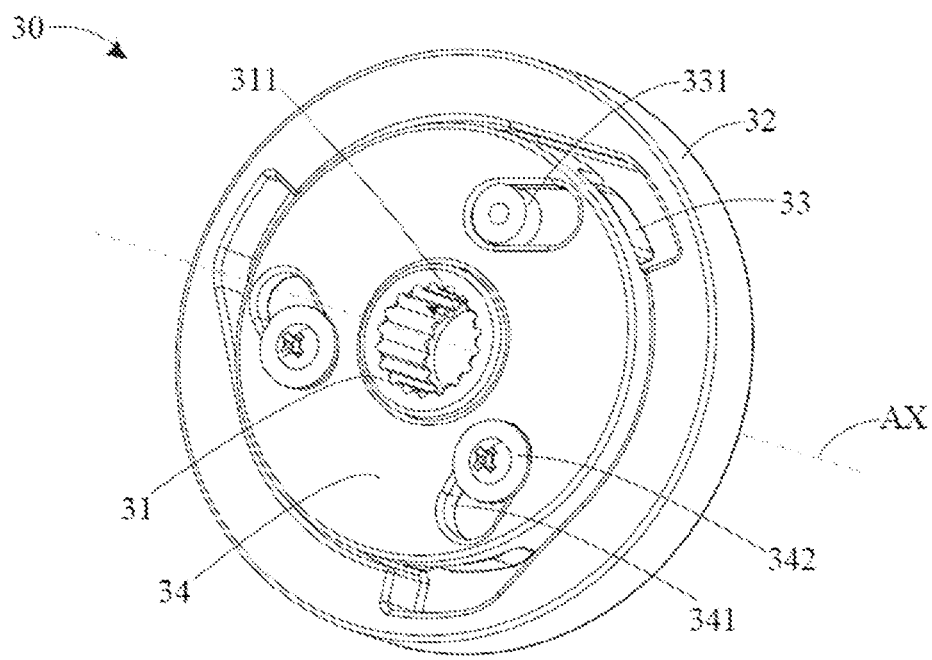
FIG. 3 is a 3D drawing of a clutch according to a preferred embodiment of the present invention.

FIGS. 1 and 2 show a lawnmower 1 as an example of the work machine according to the present invention, at least comprising a base 10, a cutting tool 11, wheels 12, a hand support frame 13, a prime mover 20 and a transmission apparatus 21. The cutting tool 11 is disposed at the bottom of the base 10, and can perform a job under the action of a driving force provided by the prime mover 20, to cut and clear weeds on a lawn. The wheels 12 are used to support the lawnmower 1 on a working surface (such as a lawn), and can rotate under the action of a driving force provided by the prime mover 20, to move the lawnmower 1 between different positions. The same prime mover 20 may be used to provide the driving forces to the wheels 12 and the cutting apparatus 11 respectively, or different prime movers 20 may be provided to provide the driving forces separately. In the embodiment shown in the figures, the lawnmower 1 comprises four wheels 12, arranged opposite each other at left and right sides of a front end and a rear end of the base 10 respectively, to realize stable support. Of course, in other embodiments, the number of wheels 12 may be set to one, two, three or more as required. The hand support frame 13 is disposed at a rear part of the lawnmower 1 and is angled upwards obliquely towards the rear, so that it can be conveniently gripped by the operator in the course of working to push the lawnmower 1 forwards and backwards.

Referring to FIG. 2, the prime mover 20 is disposed at the rear end of the base 10, close to the wheels 12 located at the rear end. The transmission apparatus 21 is located between the prime mover 20 and the wheels 12, and used to transmit a driving force therebetween. An example of the prime mover 20 could be an electric motor or internal combustion engine, etc., which may be configured to provide a driving force to only one wheel 12, or may provide a driving force simultaneously to two or more wheels 12. It is also possible to provide more than one primer mover 20 and transmission apparatus 21, to drive multiple wheels 12 separately. In the case where the prime mover 20 provides a driving force, a driven wheel 12 may be called a driving wheel, and a wheel 12 which rotates passively as the lawnmower 1 moves may be called a driven wheel. In the embodiment shown, the two wheels 12 close to the rear end of the base 10 are driven by the prime mover 20, so are driving wheels. The two wheels close to the front end of the base 10 are driven wheels.

Figure 10:
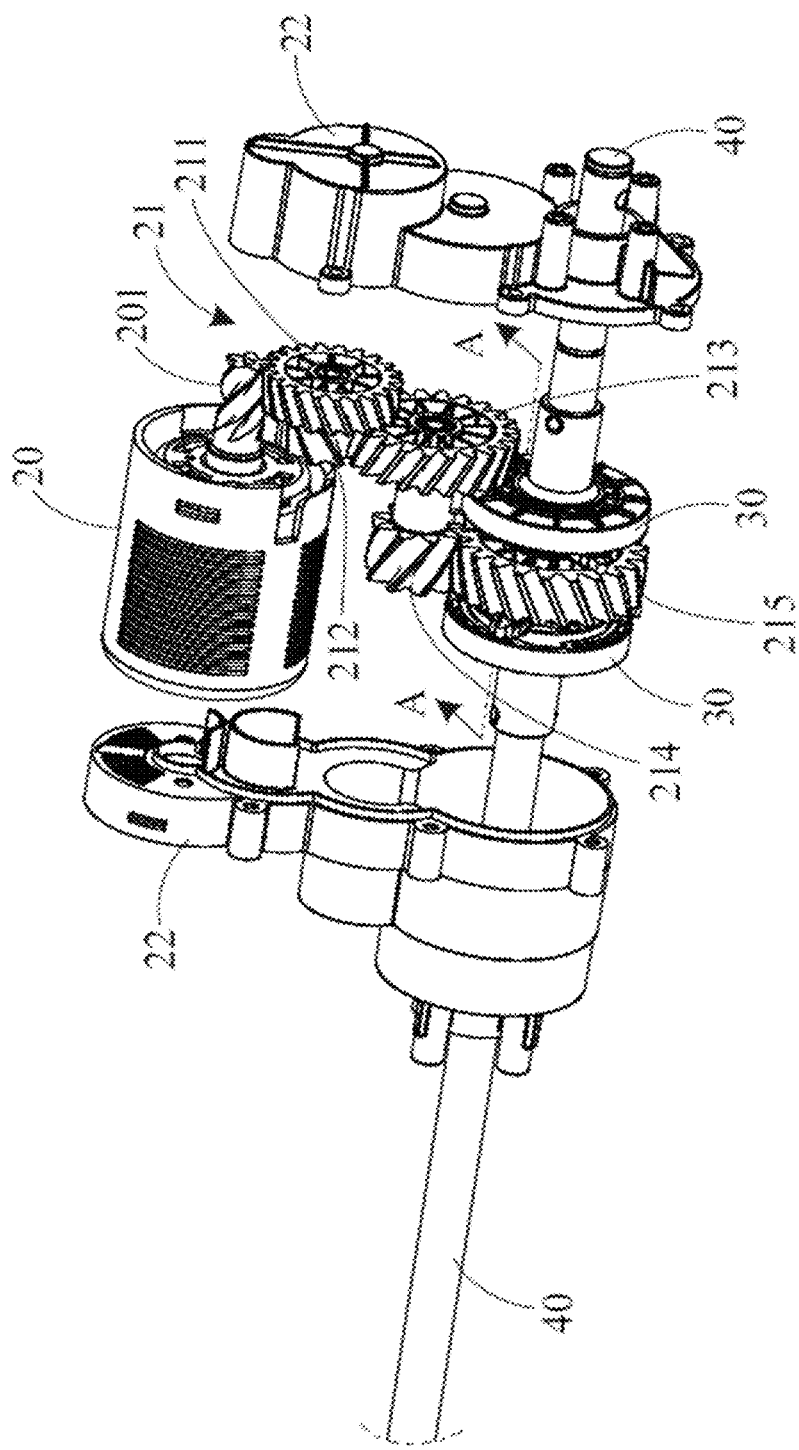
FIG. 10 shows a transmission path of a work machine according to the present invention, from the prime mover to the clutch.

FIG. 10 shows the transmission path from the prime mover 20 to the driving wheels via the transmission apparatus 21. In some embodiments, the transmission apparatus 21 comprises a transmission gear train and a clutch. An output shaft of the prime mover 20 is transmission-coupled to the clutch 30 via the transmission gear train, and further transmission-coupled to the driving wheels via the clutch 30. In the embodiment shown, an extremity of the output shaft 201 of the prime mover 20 is configured in the form of a gear, and meshed with a first gear 211 of the transmission gear train. The output shaft 201 and the first gear 211 have substantially the same linear velocity. However, the diameter of the first gear 211 is greater than the diameter of the output shaft 201, so the speed outputted by the prime mover 20 is reduced a first time at the first gear 211. The first gear 211 and a second gear 212 are arranged coaxially, and have substantially the same angular velocity. The second gear 212 and a third gear 213 are meshed, and have substantially the same linear velocity, but the diameter of the third gear 213 is greater than the diameter of the second gear 212. Thus, the speed outputted by the prime mover 20 is reduced a second time at the third gear 213. The third gear 213 is further arranged coaxially with a fourth gear 214. The fourth gear 214 and a fifth gear 215 are meshed, and have substantially the same linear velocity, but the diameter of the fifth gear 215 is greater than the diameter of the fourth gear 214. Thus, the speed outputted by the prime mover 20 is reduced a third time at the fifth gear 215. It will be understood that in different embodiments, it is possible to flexibly choose the number of stages in the transmission gear train and whether the transmission result is a reduction in speed or an increase in speed, according to actual needs.

Figure 11:
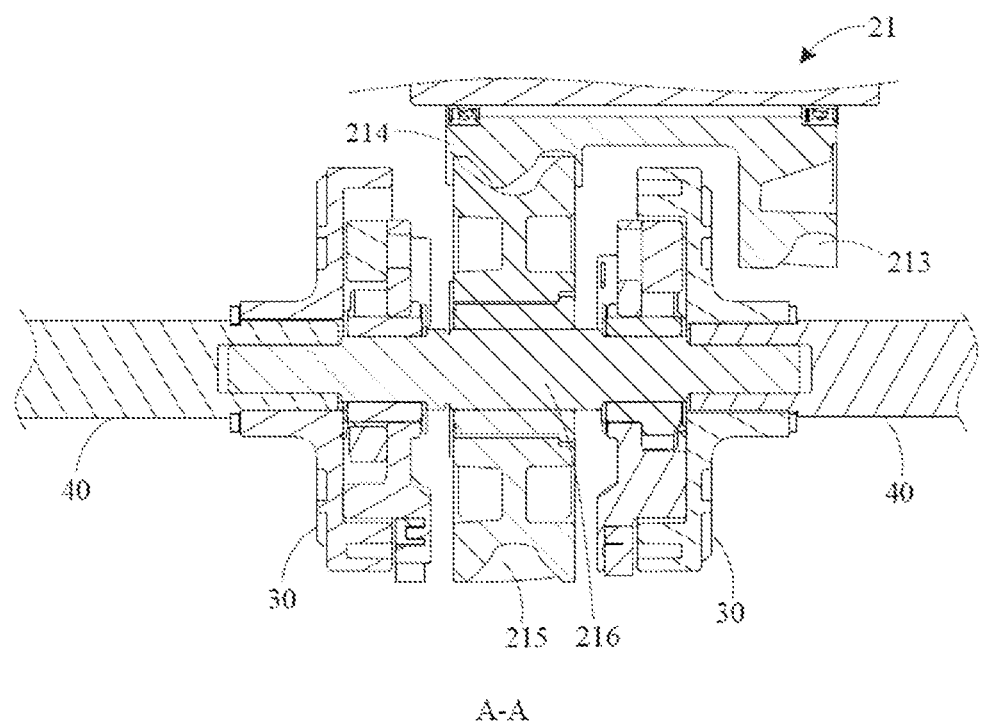
FIG. 11 is part of a sectional view taken along line A-A in FIG. 10.

As shown in FIG. 11, the fifth gear 215 forms a final-stage gear of the transmission gear train. Furthermore, the transmission gear train further comprises a coupling shaft 216 arranged coaxially with the fifth gear 215. Optionally, the final-stage gear of the transmission gear train is transmission-coupled to two clutches 30 simultaneously. These two clutches 30 are arranged substantially in a mirror-image fashion relative to the final-stage gear. Output ends of the two clutches 30 are coupled to respectively corresponding drive shafts 40. An extremity of each drive shaft 40 is further coupled to one driving wheel (not shown) respectively. For example, the extremity of the drive shaft 40 may be coupled to the driving wheel directly via a pin or splines, etc. Alternatively, a gear structure may be provided at the extremity of the drive shaft 40, and a ring gear may be provided on the driving wheel, with the transmission coupling being accomplished by meshing of the gear structure with the ring gear. In this way, the lawnmower 1 is able to drive the two driving wheels at the left and right sides simultaneously by means of a single prime mover 20 cooperating with a single transmission apparatus 21. The transmission gear train and the clutches 30 form the main part of the transmission apparatus 21. Furthermore, a transmission case 22 is also provided, in which the transmission gear train and the clutches 30 are accommodated, and which serves a protecting function, preventing the ingress of debris while also providing lubrication for the transmission gear train and other structures. Furthermore, having the clutches arranged in a mirror-image fashion can allow a speed differential (described in detail below) to arise between the driving wheels respectively corresponding to the two clutches, thereby allowing the work machine to accomplish a turning action without the prime mover 20 stopping operation, thus making it easier to operate the work machine.

FIGS. 3-6 show the clutch 30 according to some embodiments of the present invention, mainly comprising an input member 31, an output member 32 and transmission members 33.

The input member 31 for example has an input engagement part 311 configured as an internal spline structure, and may be coupled to the prime mover 20 directly (not via a drive train) or indirectly (via a drive train) by means of the input engagement part 311, thereby being able to receive a driving force from the prime mover 20, and rotate around a rotation axis AX in a drive direction F under the action of the driving force. The output member 32 is used to output rotational motion to the outside, and for example has an output engagement part 321 configured as an internal spline structure, and may be coupled to at least one wheel 12 directly or indirectly by means of the output engagement part 321, thereby being able to drive at least one wheel 12 to rotate. As shown in FIG. 10, in some embodiments, the input engagement part 311 is coupled to the prime mover 20 via the transmission gear train, while the output engagement part 321 is coupled to the wheel 12 (driving wheel) via the drive shaft 40.

Figure 5:
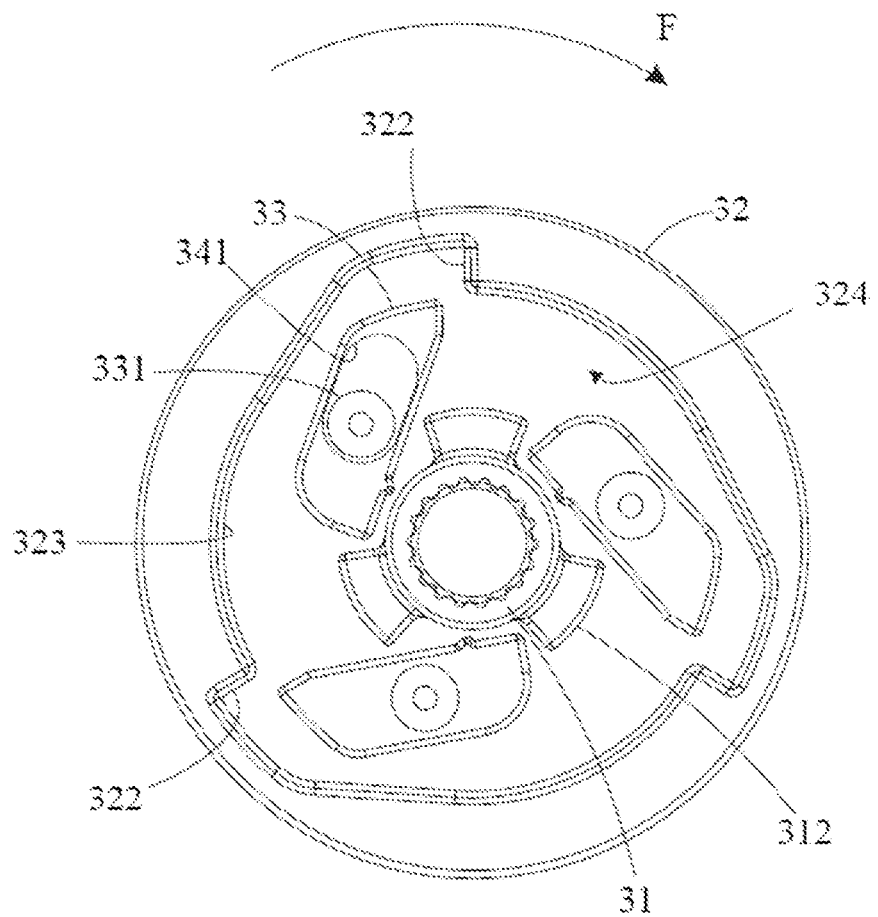
FIG. 5 is a schematic drawing of the clutch shown in FIG. 3 in a disengaged state, with the mounting member omitted.
Figure 6:
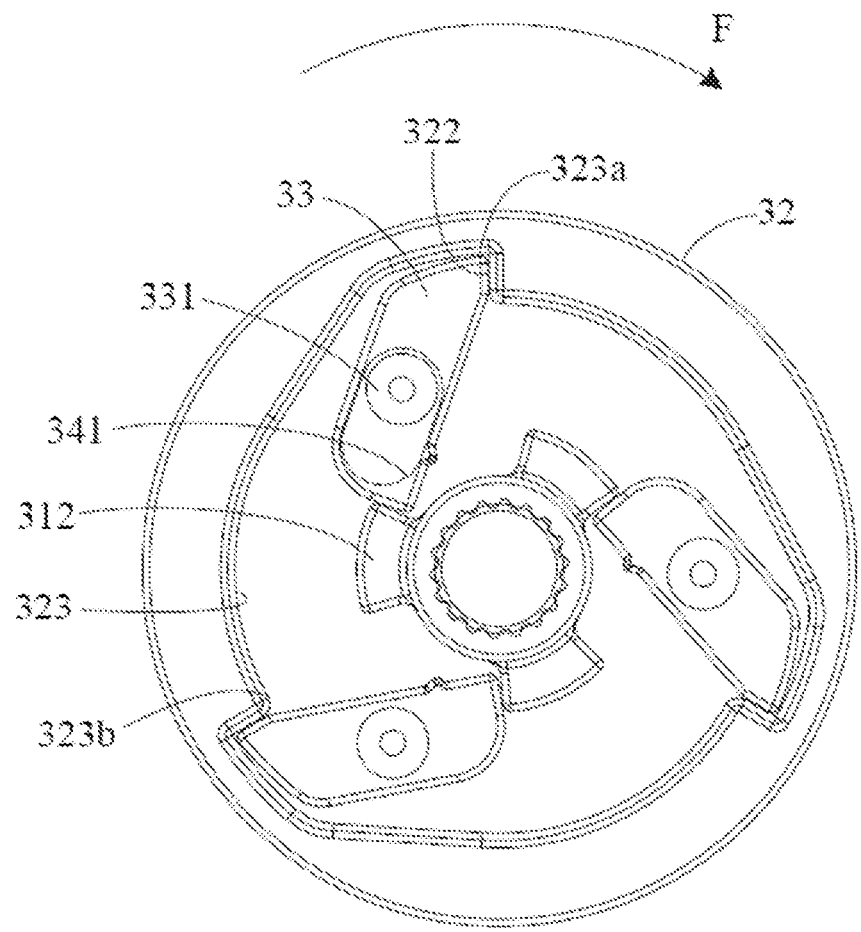
FIG. 6 is a schematic drawing of the clutch shown in FIG. 3 in an engaged state, with the mounting member omitted.

The transmission members 33 are movably arranged between the input member 31 and the output member 32. When the transmission members 33 are located at a first position as shown in FIG. 6, they can engage with the output member 32, transmitting the rotational motion of the input member 31 to the output member 32, such that the output member 32 rotates together with the input member 31. At this time, the clutch 30 is in an engaged state. When the transmission members 33 move to a second position as shown in FIG. 5, they disengage from the output member 32, at which time there is no driving force acting on the output member 32 via the input member 31, so the output member 32 remains stationary. The clutch 30 is in a disengaged state. The transmission members 33 may also be called movable pawls.

It will be understood that during normal driving, the input member 31 drives the output member 32 to rotate by means of the transmission members 33, in turn driving the wheel 12 to rotate by means of the drive shaft 40. At this time, the input member 31 and the output member 32 have substantially the same angular velocity of rotation. As stated above, in some embodiments, two clutches 30 are transmission-coupled to the same final-stage gear, and arranged in a mirror-image fashion relative to the final-stage gear. Furthermore, the clutch 30 is configured to allow the angular velocity of rotation of the output member 32 to be greater than the angular velocity of rotation of the input member 31. In this way, when the operator applies an external traction force to the wheel 12 at one side or applies unbalanced external traction forces to the wheels 12 at both sides, the wheel 12 at one side acted on by the larger force has a greater rotation speed than the wheel 12 at the other side acted on by the smaller force, i.e. a speed differential forms, at which time the work machine is able to accomplish a turning action. Since the angular velocity of rotation of the output member 32 of the clutch can be greater than the angular velocity of rotation of the input member 31, such an operation can automatically achieve a speed differential effect, without the need to manually switch the clutch 30 to the disengaged state. When the external traction force disappears, the clutch 30 will automatically re-enter the engaged state under the action of the driving force of the prime mover 20.

According to the present invention, when the driving force acts on the input member 31, the clutch 30 can automatically switch to the engaged state without the need for active operation by the operator, to output rotational motion to the outside. Specifically, referring to FIGS. 5 and 6, the input member 31 has protrusions 312 extending outwards in radial directions relative to the rotation axis AX. The transmission members 33 are disposed in the path of rotational motion of the protrusions 312. When the driving force acts on the input member 31, the protrusions 312 rotate around the rotation axis AX, and thereby contact the transmission members 33. As the rotational motion continues, the transmission members 33 are driven to move to the first position shown in FIG. 6 under the action of the protrusions 312.

The output member 32 is provided with transmission engagement parts 322. In the embodiment shown, the transmission engagement parts 322 are configured in the form of stop walls extending substantially parallel to the rotation axis AX. When the transmission members 33 move to the first position, they abut the stop walls, thereby engaging with the transmission engagement parts 322. Thus, the transmission members 33 transmit the action force of the protrusions 312 to the transmission engagement parts 322, so that the output member 32 rotates together with the input member 31. The clutch 30 automatically switches to the engaged state. Preferably, the stop walls extend substantially in said radial directions.

Figure 7:
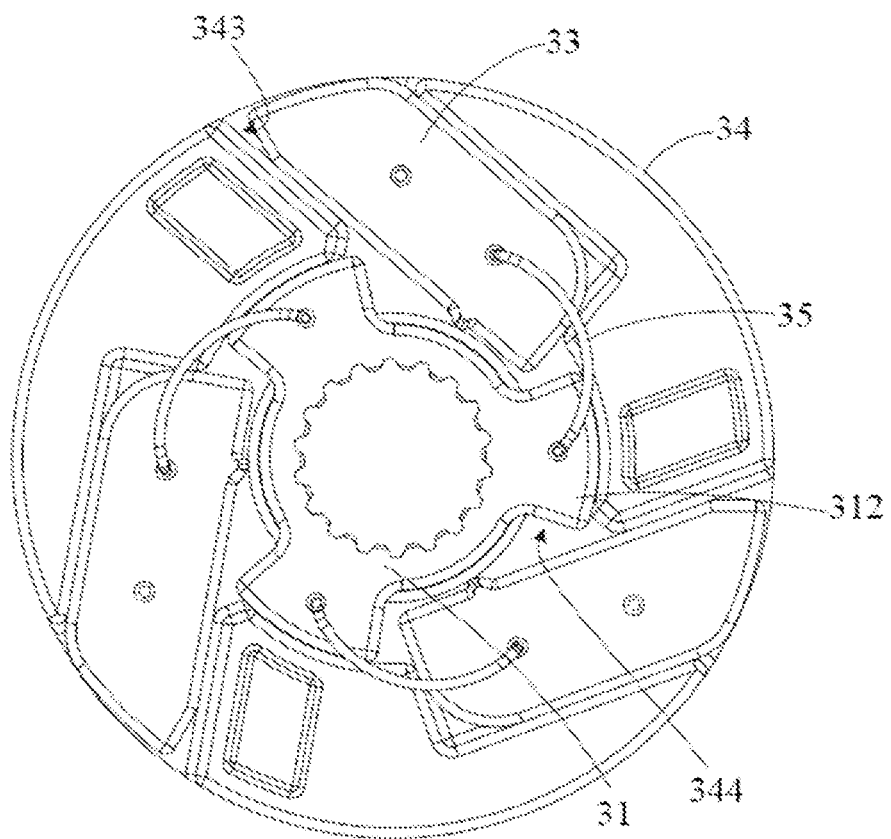
FIG. 7 is a rear view of the clutch shown in FIG. 3, with the output member omitted, showing a biasing member configured as a spring.
Figure 8:
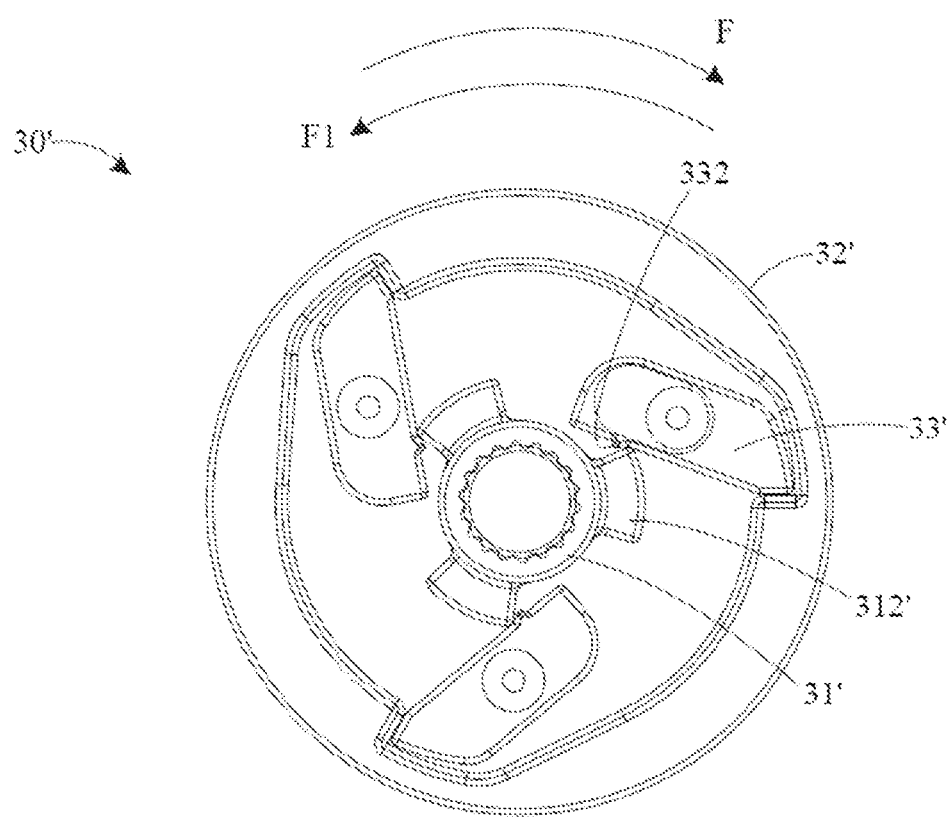
FIG. 8 is a front view of a clutch according to another preferred embodiment of the present invention.

In some embodiments, the clutch 30 is further provided with biasing members, which apply a biasing force to the transmission members 33 to bias them towards the second position. As shown in FIG. 7, the biasing member may for example a spring 35, having one end coupled to the transmission member 33, and another end coupled to the protrusion 312 which drives the transmission member 33 to move towards the first position. Preferably, the clutch 30 is further configured such that when the outputting of rotational motion is stopped, the input member 31 rotates through a predetermined angle in a direction F1 (see FIG. 8) opposite to the drive direction. This configuration may be accomplished by, for example, causing the prime mover to rotate in reverse for a predetermined time (e.g. 0.1 s) or through a predetermined angle after ceasing to operate. Thus, after the prime mover has ceased to operate, the input member 31 rotates in reverse through a predetermined angle, a sufficient gap arises between the protrusion 312 and the transmission member 33, and the transmission member 33 can move from the first position to the second position shown in FIG. 5 under the action of the biasing member, thereby causing the clutch 30 to automatically switch to the disengaged state.

In some other embodiments, the biasing member may be omitted, and the transmission member may be moved to the second position by the protrusion of the input member abutting the transmission member. Referring to the clutch 30' shown in FIG. 8, a sharp bump 332 is provided on an inner side of the transmission member 33'. When the outputting of rotational motion is stopped, the input member 31' 30) rotates through a predetermined angle in the direction F1 opposite to the drive direction. In the course of rotating in reverse, the protrusion 312' abuts the sharp bump 332 of the adjacent transmission member 33' located behind (i.e. upstream of) the protrusion in the drive direction F. As the rotation in reverse continues, the protrusion 321' drives the transmission member 33' to move to the second position. It will be understood that with such a configuration, the force applied to the sharp bump 332 by the protrusion 312' is in a direction tangential to the direction of rotation thereof, so might cause the transmission member 33' to pivot in the process of moving towards the second position.

In the second position, the transmission members 33 are located completely outside the path of rotational motion of the transmission engagement parts 322. At this time, the output member 32 can freely rotate independently of the input member 31 and the transmission members 33. In other words, if the operator wishes that the lawnmower 1 be driven to move by an external traction force (such as a pushing or pulling force applied by the operator or another external driving means) when the prime mover 20 has stopped operating, the wheel 12 coupled to the output member 32 of the clutch 30 need only drive the output member 32 to rotate with it. No action force will arise between the output member 32 and the transmission members 33/input member 31 or transmission gear train/prime mover 20. It is thus possible to reduce resistance when an external traction force drives the lawnmower 1. Moreover, at this time the wheel 12 can also drive the output member 32 to rotate in reverse, without interfering with the transmission members 33 or the input member 31. That is to say, the operator can pull the lawnmower 1 backwards.

Figure 4:
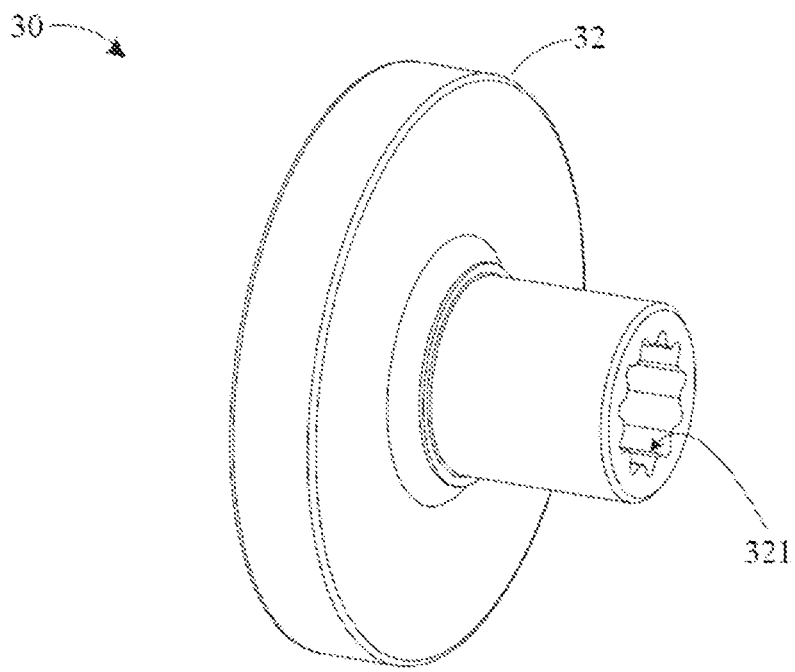
FIG. 4 is a 3D drawing of the clutch shown in FIG. 3, viewed from another angle.

As shown in FIG. 4, preferably, the clutch 30 further comprises a mounting member 34, configured as a disc-shaped structure and provided with elongated slots 341. Correspondingly, the transmission members 33 are provided with protruding pin structures 331. The transmission members 33 may be mounted on the mounting member 34 by insertion of the pin structures 331 into the elongated slots 341. Preferably, the elongated slot 341 is a penetrating slot, and a fastener 342 comprising a spacer and a screw is provided at an end of the pin structure 331. The size of at least the spacer is greater than the width of the elongated slot 341, to prevent the pin structure 331 from coming out of the elongated slot 341. It will be understood that in another embodiment, it is also possible to have the elongated slot provided in the transmission member, and have the pin structure cooperating therewith provided on the mounting member.

In addition, in an embodiment in which a biasing member is used to drive the transmission member, the mounting member may also be used to provide a force application point for the biasing member configured as a spring. One end of the spring is still coupled to the transmission member, while the other end is coupled to the mounting member, not to the protrusion of the input member as described above. The specific form of the spring may be chosen flexibly as required, e.g. a tension spring, a torsion spring, a coil spring, a specially-shaped spring, etc.

When the transmission member 33 moves between the first position and the second position, the pin structure 331 moves in the length direction of the elongated slot 341. Thus, the elongated slot 341 defines the path of movement of the transmission member 33 between the first position and the second position. According to the present invention, the movement path of the transmission member 33 has a component in a radial direction relative to the rotation axis AX. That is to say, movement of the transmission member 33 between the first position and the second position causes a change in the radial position thereof relative to the rotation axis AX. Preferably, the movement path of the transmission member 33 lies completely within a plane perpendicular to the rotation axis AX. That is to say, movement of the transmission member 33 between the first position and the second position will not give rise to axial displacement along the rotation axis AX. Such a configuration helps to reduce the axial thickness of the clutch 30 along the rotation axis AX, and will not give rise to a change in the axial dimension during operation, so makes the structure thereof compact.

Further preferably, the path of movement of the transmission member 33 between the first position and the second position is a straight line which is inclined relative to a radial direction. For example, the movement path may be substantially in a direction tangential to the path of rotational motion of the protrusion 312, or may deviate from this tangential direction by a small angle: in this way, the action torque applied to the transmission member 33 by the protrusion 312 can be maximized. Moreover, correspondingly, it is only necessary for the elongated slot 341 to be configured as a straight slot, so the structure is simple. However, it will be understood that the path of movement of the transmission member 33 between the first position and the second position may also be configured as a curve as required, i.e. the elongated slot 341 is a curved slot. In addition, the elongated slot may comprise a curved surface, to allow pivoting of the transmission member in the process of moving towards the second position, in an embodiment in which the protrusion is used to drive the transmission member towards the second position.

Referring to FIG. 7, the mounting member 34 is provided with first mounting slots 343. The first mounting slots 343 are substantially configured to be elongated in shape, and are open at a circumferential side of the mounting member 34. The transmission members 33 are accommodated in the first mounting slots 343, and are capable of moving along the first mounting slots 343 to the first position in which they project through the openings thereof, and retreating to the second position. Thus, the first mounting slots 343 can also serve to define the movement paths of the transmission members 33. In addition, a substantially round second mounting slot 344 is further provided in a middle region of the mounting member 34, the second mounting slot communicating with the first mounting slots 343. The input member 31 is accommodated in the second mounting slot 344 and is freely rotatable in the second mounting slot 344. Such a configuration can further reduce the axial thickness of the clutch 30.

It will be understood that if there is an action force between the transmission member and the mounting member, for example a frictional force, then when the input member pushes the transmission member, the latter might be unable to overcome the action force to move relative to the mounting member to the first position, and will instead directly drive the mounting member to rotate under the action of the action force. Since the transmission member has not moved to the first position, it will not engage with the output member, and the clutch will idle in the disengaged state.

Figure 9:
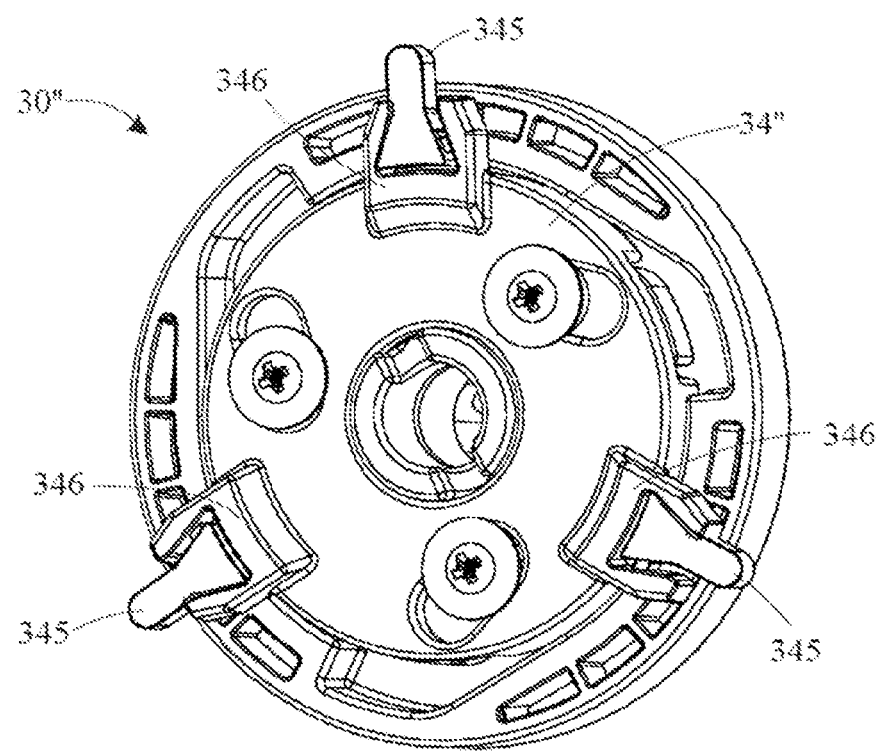
FIG. 9 is a 3D view of a clutch according to another preferred embodiment of the present invention.

To avoid this problem, referring to FIG. 9, in the clutch 30" according to some embodiments, the mounting member 34" is provided with damping elements 345, which can provide damping for the mounting member 34", so that it tends to remain stationary. The damping elements 345 may be entirely or partially made of a rubber or silicone rubber material with a large coefficient of friction, may extend radially outwards relative to the mounting member 34", and are in contact with an inner wall of the transmission case mentioned above for example. In addition, the mounting member 34" is provided with holding parts 346 for mounting the damping elements 345. When the input member rotates under the driving action of the prime mover, the protrusions of the input member abut the transmission members and push them to move towards the first position. At this time, the damping elements 345 rub against the inner wall of the transmission case, providing damping for the mounting member 34", so that it tends to remain stationary. In this way, the transmission member is able to overcome the action force between the transmission member and the mounting member 34" under the pushing action of the input member, and move smoothly relative to the mounting member 34" to the first position, so as to engage with the output member.

As shown in FIG. 5, the output member 32 is provided with a recess 324 sunk along the rotation axis AX: at least part of at least one of the transmission members 33, the mounting member 34 and the input member 31 is disposed in the recess 324. Such a configuration can likewise further reduce the axial thickness of the clutch 30 along the rotation axis AX. In another embodiment, when the input member has a larger radial dimension and the output member has a smaller radial dimension, it is also possible to have the recess provided in the input member, and have the transmission members, the mounting member and the output member at least partially disposed in the recess.

It will be understood that at least one protrusion 312, at least one transmission member 33 and at least one transmission engagement part 322 may be provided, to enable transmission of the driving force. In the embodiment shown, the clutch 30 is provided with three sets of protrusions 312, transmission members 33 and transmission engagement parts 322 which are in one-to-one correspondence and cooperate with each other: this three-set structure is distributed at uniform intervals in the circumferential direction about the rotation axis AX. However, the numbers of cooperating protrusions, transmission members and transmission engagement parts may be chosen flexibly according to changes in the dimensions and structure of the clutch: moreover, the protrusions and transmission members are not necessarily in a one-to-one correspondence relationship with the transmission engagement parts, as long as transmission of the driving force can be achieved. For example, in some embodiments, the number of transmission engagement parts may be twice that of the protrusions and transmission members, etc.

In some embodiments, the output member 32 is further provided with cam surfaces 323, configured as faces that face the transmission members 33 and are substantially parallel to the rotation axis AX, and each having a downstream end 323a and an upstream end 323b in the drive direction F, these two ends being respectively connected to two adjacent transmission engagement parts 322. Specifically, in the embodiment shown in which the transmission members 33 are located at a radially inner side of the transmission engagement parts 322, the downstream end 323a of the cam surface 323 is connected to a radially outside end of the corresponding stop wall, while the upstream end 323b of the cam surface 323 is connected to a radially inside end of the corresponding stop wall (i.e. the adjacent stop wall located behind the stop wall connected to the downstream end 323a in the drive direction F). Preferably, at least part of the cam surface 323 is a smooth curved surface.

As an alternative embodiment, when the transmission members are located at a radially outer side of the transmission engagement parts, the downstream end of the cam surface should be connected to a radially inside end of the corresponding stop wall, while the upstream end of the cam surface should be connected to a radially outside end of the corresponding stop wall.

When the prime mover 20 is in an operational state, if an external traction force is applied at the same time, for example the lawnmower 1 is pushed manually, then the rotation speed of the wheels 12 increases, and the output members 32 coupled to the drive shafts 40 are driven via the drive shafts to rotate at a faster speed. The stop wall structure described above allows the output member 32 to rotate at a higher angular velocity than the input member 31 and transmission members 33. That is to say, the angular velocity of the stop walls is greater than the angular velocity of the transmission members 33 in abutment therewith, so the transmission members 33 move backwards relative to the abutted stop walls and thereby disengage, and slide along the cam surfaces 323. The cam surfaces 323 may press the transmission members 33 back to the second position, such that the clutch 30 automatically switches to the disengaged state. Thus, even if the transmission members 33 are located in the path of rotational motion of the transmission engagement parts 322 at this time, they will not cause interference to relative motion between the output member 32 and the transmission members 33.

Such a configuration allows the output member 32 to move at a higher speed relative to the input member 31 and the transmission members 33. For example, in the process of the lawnmower 1 being driven by the prime mover 20, when it is necessary to turn, the operator can apply a pushing force, so that the wheel 12 of the lawnmower 1 that is located at the outer side of the turning radius rotates at a faster speed, and a speed differential thus arises between the wheels 12 at the inner and outer sides of the turning radius, to smoothly accomplish the turning action. Due to the presence of the clutch 30, even if the operator does not stop the prime mover 20, it will not cause any interference or effect on the driving of the wheel 12 located at the outer side of the turning radius—this is very convenient. When turning is complete, the operator stops applying the pushing force, the rotation speed of the wheel 12 falls until it is equal to or slightly less than the rotation speed of the input member 31 and transmission members 33 of the clutch 30, the transmission members 33 are pushed to the first position by the input member 31, the clutch 30 automatically switches to the engaged state, and the lawnmower 1 can thus return to the pre-turning state of being driven by the prime mover 20. The clutch 30 is able to automatically switch between states to adapt to changes in the rotation speed of the wheels 12, without any need to manually switch the state of the clutch 30.

The above description of various embodiments of the present invention is provided to a person skilled in the art for descriptive purposes. It is not intended that the present invention be exclusively or limited to a single disclosed embodiment. As mentioned above, those skilled in the art will understand various alternatives and variations of the present invention. Thus, although some alternative embodiments have been specifically described, those skilled in the art will understand, or develop with relative ease, other embodiments. The present invention is intended to include all alternatives, modifications and variants of the present invention described here, as well as other embodiments which fall within the spirit and scope of the present invention described above.

The invention claimed is:

1. A clutch comprising:
    an input member configured to receive a driving force and rotatable about a rotation axis under action of the driving force, the input member having at least one protrusion extending in a radial direction relative to the rotation axis;
    an output member configured to output rotational motion and having at least one transmission engagement part;
    a mounting member comprising:
        at least one elongated slot defining a movement path; and
        a damping element configured to dampen the mounting member against rotation from the driving force; and
    at least one transmission member disposed in the at least one elongated slot, the at least one transmission member configured to move within the at least one elongated slot between a first position in which the at least one transmission member is engageable with the at least one transmission engagement part and a second position of disengagement, the at least one transmission member being located in a path of rotational motion of the at least one protrusion to abut the at least one protrusion and be driven to move to the first position by rotation of the input member, wherein displacement of the at least one transmission member between the first position and the second position has a component in the radial direction.

2. The clutch according to claim 1, wherein the clutch further comprises a biasing member which biases the at least one transmission member towards the second position.

3. The clutch according to claim 2, wherein the biasing member is a spring having one end coupled to the at least one transmission member and another end coupled to the input member or the mounting member.

4. The clutch according to claim 1, wherein the at least one transmission member is configured to be driven by the input member to move from the first position to the second position.

5. The clutch according to claim 1, wherein the at least one transmission member comprises a sharp bump, wherein the sharp bump abuts the protrusion when the at least one transmission member is in the first position, and wherein rotation of the input member in a direction opposite to a drive direction causes the protrusion to pull the sharp bump such that the at least one transmission member is driven to move from the first position to the second position.

6. The clutch according to claim 5, wherein the clutch is coupled to a prime mover that provides the driving force to the input member, and wherein the clutch is configured to be rotationally driven by the prime mover through a predetermined angle in the direction opposite to the drive direction when the outputting of rotational motion in the drive direction is stopped.

7. The clutch according to claim 1, wherein the at least one transmission member moves in a plane perpendicular to the rotation axis.

8. The clutch according to claim 7, wherein the at least one transmission member moves in the plane between the first position and the second position along a straight line inclined relative to the radial direction.

9. The clutch according to claim 1, wherein the at least one protrusion comprises three protrusions arranged at uniform intervals in a circumferential direction about the rotation axis, and the at least one transmission member comprises three transmission members arranged in one-to-one correspondence with the three protrusions.

10. The clutch according to claim 1, wherein the at least one transmission engagement part of the output member comprises a stop wall extending parallel to the rotation axis, the at least one transmission member abutting the stop wall to achieve engagement with the at least one transmission engagement part.

11. The clutch according to claim 10, wherein the output member is provided with a cam surface extending parallel to the rotation axis; the cam surface is located between two adjacent stop walls, and connects a radially outside end of one of the stop walls to a radially inside end of the other adjacent stop wall, at least part of the cam surface being a curved surface.

12. The clutch according to claim 1, wherein the dampening element extends radially outward from the mounting member and is configured to contact an inner wall of a transmission case in which the clutch is disposed.

13. The clutch according to claim 1, wherein the at least one elongated slot comprises a curved surface to allow the at least one transmission member to pivot in the at least one elongated slot.

14. The clutch according to claim 1, wherein:
    the output member is provided with a recess, and at least one of the at least one transmission member, the mounting member, and the input member is at least partially disposed in the recess; or
    the input member is provided with a recess, and at least one of the at least one transmission member, the mounting member, and the output member is at least partially disposed in the recess.

15. The clutch according to claim 1, wherein the dampening element comprises a rubber material supported by a holding part of the mounting member.

16. The clutch according to claim 1, wherein the damping element comprises a plurality of damping elements circumferentially spaced apart about a circumference of the mounting member.

17. A clutch comprising:
    an input member configured to be driven about a rotation axis;
    a mounting member coaxially aligned with the input member;
    a transmission member coupled to the mounting member and movable by the input member in a radial direction between a drive position and a disengaged position; and
    an output member comprising a transmission engagement part configured to be driven by the transmission member when the transmission member is in the drive position,
    wherein the mounting member comprises a damping element that restricts rotation of the mounting member when the input member is driven until the transmission member reaches the drive position.

18. The clutch of claim 17, wherein the transmission member comprises a plurality of transmission members configured to move simultaneously between the drive position and the disengaged position.

19. A clutch comprising:
an input member configured to receive a driving force and rotatable about a rotation axis;
a mounting member coaxially aligned with the input member;
an output member having a plurality of transmission engagement parts; and
a plurality of transmission members coupled to the mounting member and movable under action of the input member, each of the plurality of transmission members configured to be simultaneously movable between a first position in which the transmission members are engaged with the transmission engagement parts and a second position of disengagement, wherein displacement of the plurality of transmission members between the first position and the second position has a component in the radial direction,
wherein the mounting member is configured to restrict rotation of the mounting member when the input member receives the driving force until the transmission members reach the first position.

20. The clutch of claim 19, wherein the mounting member comprises a plurality of damping elements circumferentially spaced apart about a circumference of the mounting member, wherein the dampening elements each extend from the mounting member and are configured to contact an inner wall of a transmission case in which the clutch is disposed.

* * * * *